(12) United States Patent
Wang et al.

(10) Patent No.: US 7,625,963 B2
(45) Date of Patent: Dec. 1, 2009

(54) REACTIVE HOT MELT ADHESIVE WITH BITUMINOUS ADDITIVE

(75) Inventors: Yongxia Wang, Bridgewater, NJ (US); Louis A. Moore, High Bridge, NJ (US); Gary Raykovitz, Flemington, NJ (US)

(73) Assignee: Henkel AG & Co. KGaA, Duesseldorf (DE)

( * ) Notice: Subject to any disclaimer, the term of this patent is extended or adjusted under 35 U.S.C. 154(b) by 228 days.

(21) Appl. No.: 11/657,859

(22) Filed: Jan. 25, 2007

(65) Prior Publication Data

US 2008/0182925 A1 Jul. 31, 2008

(51) Int. Cl.
*C08L 95/00* (2006.01)

(52) U.S. Cl. .............................. 524/68; 524/59; 524/69; 524/70; 524/71; 524/705; 156/331.7; 156/337

(58) Field of Classification Search .................. 524/59, 524/68–71, 705; 156/331.7, 337
See application file for complete search history.

(56) References Cited

U.S. PATENT DOCUMENTS

| | | | |
|---|---|---|---|
| 3,931,077 A | | 1/1976 | Uchigaki et al. |
| 4,775,719 A | | 10/1988 | Markevka et al. |
| 4,808,255 A | | 2/1989 | Markevka et al. |
| 4,820,368 A | | 4/1989 | Markevka et al. |
| 4,871,792 A | | 10/1989 | Lucke |
| 5,008,311 A | * | 4/1991 | Janoski .......................... 524/59 |
| 5,021,507 A | | 6/1991 | Stanley et al. |
| 5,253,461 A | * | 10/1993 | Janoski et al. ................. 52/408 |
| 5,319,008 A | * | 6/1994 | Janoski .......................... 524/59 |
| 5,421,876 A | | 6/1995 | Janoski |
| 5,506,296 A | | 4/1996 | Chenard et al. |
| 5,670,577 A | | 9/1997 | Dawson, Jr. |
| 5,714,563 A | | 2/1998 | DePompei et al. |
| 5,866,656 A | | 2/1999 | Hung et al. |
| 6,060,574 A | | 5/2000 | Schmalstieg et al. |
| 6,271,305 B1 | | 8/2001 | Rajalingam et al. |
| 6,296,912 B1 | | 10/2001 | Zickell |
| 6,381,449 B1 | | 4/2002 | Yamaji et al. |
| 6,387,449 B1 | | 5/2002 | Reid et al. |
| 6,482,878 B1 | | 11/2002 | Chu |
| 6,531,200 B2 | | 3/2003 | Zickell et al. |
| 6,538,060 B2 | | 3/2003 | Rajalingam et al. |
| 7,317,051 B2 | * | 1/2008 | Georgeau et al. ........... 524/837 |
| 2002/0061379 A1 | | 5/2002 | Zickell et al. |
| 2005/0107499 A1 | | 5/2005 | Georgeau et al. |

FOREIGN PATENT DOCUMENTS

| | | |
|---|---|---|
| EP | 0 420 246 | 4/1991 |
| EP | 0420246 | 4/1991 |
| WO | 96/17029 | 6/1996 |
| WO | 9617029 | 6/1996 |
| WO | WO 00/11111 | 3/2000 |

OTHER PUBLICATIONS

Robert M. Evans, Polyurethane Sealants: Technology and Applications, Technomic Publishing Company, Inc., Lancaster, PA, Chapt. 7, p. 139 and Chapt. 9, p. 180, 1993.
Sartomer Application Bulletin, Poly bd Resins in Adhesives Applications, No. 4903, 08/04, section 2.4, pp. 14 and 15.
Sartomer Application Bulletin, Poly bd Resins in Construction Applications, No. 4925, 10/04, pp. 2-4.
ASI "Asphalt-Modified Polyurethanes Show Advantages in Construcitn Sealants", Jun. 1, 2000.

* cited by examiner

*Primary Examiner*—Peter Szekely
(74) *Attorney, Agent, or Firm*—Sun Hee Lehmann

(57) ABSTRACT

A polyurethane hot melt adhesive composition comprising an isocyanate, one or more polyols, one or more bituminous materials and optionally one or more thermoplastic materials. Another embodiment is directed to a method for bonding materials together which comprises applying the reactive hot melt adhesive composition in a liquid form to a first substrate, bringing a second substrate in contact with the composition applied to the first substrate, and subjecting the applied composition to conditions which will allow the composition to cool and cure to an irreversible solid form, said conditions comprising moisture. Still another aspect is directed to an article of manufacture comprising the adhesive.

15 Claims, No Drawings though not limited to, SBS block copolymers, SB block copolymers, SIS block copolymers, SEBS block copolymers, EVA polymers, polyethylene polymers, polypropylene polymers, ethylene methyl acrylates, ethylene ethyl acrylates, ethylene vinyl acetates, ethylene butyl acrylates, polyesters, polyamides, isotactic polypropylenes, atactic polypropylenes, amorphous polyalphaolefins (APAO), ethylene-propylene rubbers, nitrile rubbers, neoprene, polysulfide rubbers, styrene butadiene rubbers, isoprene rubbers, acrylic rubbers, and butyl rubbers.

REACTIVE HOT MELT ADHESIVE WITH BITUMINOUS ADDITIVE

FIELD OF THE INVENTION

The invention relates to hot melt adhesives, in particular reactive hot melt adhesives containing bituminous materials and having improved properties.

BACKGROUND OF THE INVENTION

Hot melt adhesives are solid at room temperature but, upon application of heat, melt to a liquid or fluid state in which form they are applied to a substrate. On cooling, the adhesive regains its solid form. The hard phase(s) formed upon cooling the adhesive imparts all of the cohesion (strength, toughness, creep and heat resistance) to the final adhesive. Curable hot melt adhesives, which are also applied in molten form, cool to solidify and subsequently cure by a chemical crosslinking reaction. An advantage of hot melt curable adhesives over traditional liquid curing adhesives is their ability to provide "green strength" upon cooling prior to cure. Advantages of hot melt curable adhesives over non-curing not melt adhesives include improved temperature and chemical resistance.

The majority of reactive hot melts are moisture-curing urethane adhesives. These adhesives consist primarily of isocyanate terminated polyurethane prepolymers that react with surface or ambient moisture in order to chain-extend, forming a new polyurethane polymer. Polyurethane prepolymers are conventionally obtained by reacting polyols with isocyanates. Cure is obtained through the diffusion of moisture from the atmosphere or the substrates into the adhesive, and subsequent reaction. The reaction of moisture with residual isocyanate forms carbamic acid. This acid is unstable, decomposing into an amine and carbon dioxide. The amine reacts rapidly with isocyanate to form a urea. The final adhesive product is a crosslinked material polymerized primarily through urea groups and urethane groups.

Additives are commonly included in reactive hot melt adhesive formulations. It is particularly advantageous to incorporate low cost additives that would provide improved properties. Any additives, however, must be compatible with the adhesive so as to provide a smooth textured adhesive. Incompatible additives result in undesirable properties, such as graininess in the adhesive's texture and poor shelf stability. Bituminous materials are often low in cost, however have not been successfully utilized in reactive hot melt adhesives because of many undesirable properties, such as lack of compatibility. It would be desirable to develop a reactive hot melt adhesive that utilized a low cost bituminous additive with desirable results, such as a non-objectionable odor and storage stability. The present invention addresses this need.

SUMMARY OF THE INVENTION

The invention provides moisture curable reactive hot melt adhesive compositions that contain bituminous materials and have improved properties without utilizing a compatabilizing plasticizer or a tackifier.

One aspect of the invention is directed to a polyurethane hot melt adhesive composition comprising an isocyanate, one or more polyols, one or more bituminous materials and optionally one or more thermoplastic materials. Another embodiment of the invention is directed to a method for bonding materials together which comprises applying the reactive hot melt adhesive composition of the invention in a liquid form to a first substrate, bringing a second substrate in contact with the composition applied to the first substrate, and subjecting the applied composition to conditions which will allow the composition to cool and cure to an irreversible solid form, said conditions comprising moisture.

Still another aspect of the invention is directed to an article of manufacture comprising the adhesive of the invention.

DETAILED DESCRIPTION OF THE INVENTION

The disclosures of all documents cited herein are incorporated in their entireties by reference.

All percents are percent by weight of the adhesive composition, unless otherwise stated.

It has been discovered that polyurethane adhesives containing bituminous materials may be obtained with improved properties without utilizing a compatabilizing plasticizer or a tackifier. Among the improved properties are storage stability and low, non-objectionable odor when used in the traditional reactive hot melt applications such as spraying, extruding, roll coating and bead applications. The reactive hot melt adhesive containing bituminous material is compatible over a wide range of melt viscosities such that it does not perform any phase separation, gelling or agglomerating upon packaging, storing or dispensing. Further, the reactive hot melt adhesive of the present invention may be fully utilized without the use of any tackifier or compatabilizing plasticizer or curing agent. An additional advantage of the present invention is that the adhesive of the invention may be prepared without the use of expensive high intensity mixing equipment. It is to be understood that while various ingredient amounts are stated herein, there are many other formulation possibilities that could be obtained with routine experimentation that are within the scope of the present invention The adhesives of the invention comprise an isocyanate, methyenebisphenyldiisocyanate (MDI), HMDI or IPDI being preferred, from about 2 to about 98 wt % and preferably from about 2 to about 80 wt % and most preferably from about 5 to about 50 wt % of polyol, from about 0.1 to about 80 wt % and preferably from about 5 to about 50 wt % and most preferably from about 10 to about 40 wt % of one or more bituminous materials, and optionally from about 0 to about 40 wt % of a thermoplastic material.

The reactive hot melt compositions of the invention are useful for bonding articles composed of a wide variety of substrates (materials), including but not limited to wood, metal, polymeric plastics, glass and textiles. As such, these adhesives find particular use in applications such as use in water towers, for bonding to exterior surfaces, bonding to wood with high levels of pitch and e.g., in marine and automotive applications. Other non-limiting uses include textile bonding applications (carpet and clothing), use in the manufacture of footwear (shoes), use as a glazing/backbedding compound in the manufacture of windows, use in the manufacture of doors including entry doors, garage doors and the like, use in the manufacture of architectural panels, use in bonding components on the exterior of vehicles, and the like.

The term bituminous materials encompasses a wide-range of carbon-rich materials. Bituminous materials that may be utilized in the reactive hot melt adhesive of the present invention include, but are not limited to, different grades of asphalt, including straight run asphalt, oxidized asphalt, polymer-modified asphalt, and performance grade asphalt, irrespective of their softening points and penetrations. To improve its properties, performance and applications, asphalt may be modified through the addition of various polymers, such as polyethylenes, polypropylenes, polystyrenes, different block, graft and random copolymers, virgin rubber and rubber from crumb rubber.

The urethane prepolymers that can be used to prepare the adhesives of the invention are those conventionally used in the production of polyurethane hot melt adhesive compositions. Any suitable compound, which contains two or more isocyanate groups, may be used for preparing the urethane prepolymers. Typically from about 2 to about 25 parts by weight of an isocyanate is used.

Organic polyisocyanates, which may be used to practice the invention, include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, toluene diisocyanate, cyclopentylene-1,3-diisocyanate, cyclo-hexylene-1,4-diisocyanate, cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenyl-methane-2,2',5,5-tetratetraisocyanate, and the like. While such compounds are commercially available, methods for synthesizing such compounds are well known in the art. Preferred isocyanate-containing compounds are MDI, isophoronediisocyante (IPDI), hydrogenated MDI (HMDI) and toluene diisocyanate (TDI).

Most commonly, the prepolymer is prepared by the polymerization of a polyisocyanate with a polyol, most preferably the polymerization of a diisocyanate with a low molecular weight diol. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol, castor oil and vegetable oils of different molecular weight and functionality, other fatty polyols, polybutadiene diol, polyisobutylene diol as well as mixtures thereof. The polyol is typically used in an amount of between about 5 to about 50 parts by weight.

Examples of polyether polyols include a linear and/or branched polyether having hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, dipropylene glycol, triethylene glycol, 2-ethylhexandiol-1,3,glycerin, 1,2,6-hexane triol, trimethylol propane, trimethylol ethane, tris(hydroxyphenyl)propane, triethanolamine, triisopropanolamine, ethylenediamine and ethanolamine; with at least one compound selected from the group consisting of ethylene oxide, propylene oxide and butylene oxide.

A number of suitable polyols are commercially available. Non-limiting examples include polyethers such as ARCOL PPG 2025 (Bayer), PolyG 20-56 (Arch) and Pluracol P-2010 (BASF), polyesters such as Dynacoll 7360 (Degussa), Fomrez 66-32 (Crompton), Rucoflex S-105-30 (Bayer) and Stepanpol PD-56 (Stepan), and polybutadiene such as PolyBD R-45HTLO (Sartomer). "Polymer polyols" are also suitable, i.e., graft polyols containing a proportion of a vinyl monomer, polymerized in situ, e.g., Niax 34-28 (Union Carbide). Additional polyols include polycaprolactone diols and polycarbonate diols.

Certain types of polyester polyols are formed from the condensation of one or more polyhydric alcohols having from 2 to 15 carbon atoms with one or more polycarboxylic acids having from 2 to 14 carbon atoms. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, chloropentanediol, glycerol monallyl ether, glycerol monoethyl ether, diethylene glycol, 2-ethylhexanediol-1,4, cyclohexanediol-1,4,1,2,6-hexanetriol, 1,3,5-hexanetriol, 1,3-bis-(2-hydroxyethoxy)propane and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid.

Examples of fatty polyols may include castor oil, the products of hydroxylation of unsaturated or polyunsaturated natural oils, the products of hydrogenations of unsaturated or polyunsaturated polyhydroxyl natural oils, polyhydroxyl esters of alkyl hydroxyl fatty acids, polymerized natural oils, and alkylhydroxylated amides of fatty acids.

Preferably the adhesive is prepared by including a thermoplastic polymer. The thermoplastic polymer may be either a functional or a non-functional thermoplastic. Suitable thermoplastic polymers include acrylic polymers, functional acrylic polymers, non-functional acrylic polymers, acrylic block copolymer, acrylic polymer having tertiary-alkyl amide functionality, polysiloxane polymers, polyesters, polystyrene copolymers, polyvinyl polymers, divinylbenzene copolymers, polyetheramides, polyvinyl acetal, polyvinyl butyral, polyvinyl acetate, polyvinyl chloride, methylene polyvinyl ether, cellulose acetate, styrene acrylonitrile, amorphous polyolefin, thermoplastic urethane, polyacrylonitrile, ethylene vinyl acetate copolymer, ethylene vinyl acetate terpolymers, functional EVA, ethylene acrylate copolymer, ethylene acrylate terpolymer, ethylene butadiene copolymers and/or block copolymers, styrene butadiene block copolymer, and mixtures thereof.

A number of suitable thermoplastic polymers are commercially available. Non-limiting examples include ethylene vinyl acetate copolymers such as the Elvax® EVA resins (Dupont), ethylene acrylate copolymers such as the Enable™ resins (ExxonMobil), ethylene vinyl acetate or ethylene acrylate terpolymers such as the Elvaloy® terpolymers (Dupont), and acrylic polymers such as the Elvacite® resins (Lucite).

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above.

Further, small amounts of low molecular weight dihydroxy, diamino, or amino hydroxy compounds may be used as chain extenders.

While the adhesives may be used directly as described above, if desired the adhesives of the present invention may also be formulated with conventional additives which are compatible with the composition. Such additives include defoamers, plasticizers, compatible tackifiers, curing catalysts, dissociation catalysts, fillers, rheology modifiers, antioxidants, pigments, adhesion promoters, stabilizers, aliphatic $C_5$-$C_{10}$ terpene oligomers and the like. Conventional additives that are compatible with a composition according to this invention may simply be determined by combining a potential additive with the composition and determining if they are compatible. An additive is compatible if it is homogenous within the product. Non-limiting examples of suitable additives include, without limitation, rosin, rosin derivatives, rosin ester, aliphatic hydrocarbons, aromatic hydrocarbons, aromatically modified aliphatic hydrocarbons, terpenes, terpene phenol, modified terpene, high molecular weight hindered phenols and multifunctional phenols such as sulfur and phosphorous-containing phenol, terpene oligomers, DMDEE, paraffin waxes, microcrystalline waxes and hydrogenated castor oil. The reactive hot melt adhesives of the invention may also contain flame retardant components The invention also provides a method for bonding articles together which comprises applying the reactive hot melt adhesive composition of the invention in a liquid melt form to a first article, bringing a second article in contact with the composition applied to the first article, and subjecting the applied composition to conditions which will allow the composition to cool and cure to a composition having an irreversible solid form, said conditions comprising moisture. The composition is typically distributed and stored in its solid form, and is stored in the absence of moisture. When the composition is ready for use, the solid is heated and melted prior to application. Thus, this invention includes reactive polyurethane hot melt adhesive compositions in both its solid form, as it is typically to be stored and distributed, and its liquid form, after it has been melted, just prior to its application.

After application, to adhere articles together, the reactive hot melt adhesive composition is subjected to conditions that will allow it to solidify and cure to a composition that has an irreversible solid form. Solidification (setting) occurs when the liquid melt is subjected to room temperature. Curing, i.e. chain extending, to a composition that has an irreversible solid form, takes place in the presence of ambient moisture.

The invention is further illustrated by the following non-limiting examples.

EXAMPLES

Various formulations of reactive hot melt adhesives were prepared according to the following method.

Weigh in the desired amount of polyether polyol, polyester polyol, poly BD, and/or EVA to a clean container. Mix the ingredients well and then charge in the asphalt and mix again. The mixture should then be melted at a temperature of 120-140° C. for about 1 to 3 hours. While the mixture is being melted, preheat a 3-hole kettle lid and a stir paddle equipped Glascol heating mantle, which can accommodate the container, to 120° C. Assemble the container into the Glascol heating mantle and apply vacuum to the system for 2 hours with agitation. After breaking the vacuum MDI is added to the mixture. The mixture should be reacted for about 2 hours at a temperature in the range of about 120-140° C. After the reaction, degas and draw off batch to proper containers.

The compositions of the formulations are shown in Table 1.

TABLE 1

Reactive hot melt adhesive formulations.

| Ingredient (all in wt %) | 1 | 2 | 3 | 4 | 5 | Comparative Formula A |
|---|---|---|---|---|---|---|
| Low functionality Poly BD polyol | 41.3 | 30.3 | 15.0 | 30.3 | 20.0 | 26.6 |
| Trumbull asphalt #1415[1] | 50.0 | 26.8 | 29.4 | — | 26.8 | 30.8 |
| Trumbull asphalt #1410[2] | — | — | — | 26.8 | — | — |
| MDI | 8.7 | 16.9 | 13.3 | 16.9 | 14.2 | 17.6 |
| 400 MW polyether polyol | — | 13.0 | — | 13.0 | — | 15.0 |
| 700 MW polyether polyol | — | — | 12.9 | — | 13.0 | — |
| 40% VA, 51 MI EVA | — | 13.0 | 18.0 | — | — | — |
| 33% VA, 43 MI EVA | — | — | — | — | 16.0 | — |
| EVA terpolymer | — | — | — | 13.0 | — | — |
| Polyester polyol[3] | — | — | 11.4 | — | 10.0 | — |
| Tackifier[4] | — | — | — | — | — | 10.0 |

[1]Modified asphalt, commercially available from Owens Corning Company
[2]Unmodified asphalt, commercially available from Owens Corning Company
[3]STAPANPOL PD-56, commercially available from Stepan Company
[4]Mixture of EDR-179X, commercially available from Exxon and NOR-SOLENE S115, commercially available from Sartomer.

The formulations were tested for reactive hot melt properties.

Viscosity was tested on a Brookfield DV-I+ viscometer using a #27 spindle. The temperature used was 250° F.

Green strength was tested by the dynamic peel method. First, a molten adhesive film was drawn on a heated glass plate. A one inch wide vinyl strip was then rolled onto the molten adhesive film. The glass plate was placed horizontally on two racks and a 103-gram weight was attached to one end of the vinyl strip. The distance that the vinyl peels from the glass plate was measured as a function of time as the adhesive cooled down to room temperature. In this test, the lower the peel speed, the higher the green strength of the adhesive.

Open time was tested by the lap shear method. Adhesive was coated on particle board and high pressure laminate strips were then mated on the adhesive at the desired open times. The bonds were allowed to cure for 24 hours before being examined on an Instron machine at 0.5 in/min crosshead speed. Failure mode and failure strength in psi unit were recorded. Open time was defined as the longest time during which substrate failure was observed.

Wood adhesion was tested by the lap shear method described above. In this test, minimal open time was used. The bonds were cured for 7 days before tested.

Plastic adhesion was tested between untreated acrylic substrates by the lap shear method.

The results of the testing are shown in Table 2.

TABLE 2

Reactive hot melt formulation properties

| | Formulation | | | | | |
|---|---|---|---|---|---|---|
| | 1 | 2 | 3 | 4 | 5 | Comp. A |
| Appearance | Smooth | Smooth | Smooth | Slightly Grainy | Smooth | Very Grainy |
| Viscosity (cps) | 5250 | 21700 | 36810 | 40120 | 37400 | 4762 |
| Green Strength (Peel at 38° C.) (mm/mm) | 152 | 20 | 63 | 5.8 | 66 | 37 |
| Open Time (lap shear) (min) | >30 | 30 | >30 | <5 | <5 | 20 |
| Wood adhesion (psi)* | >400 | >400 | >400 | >400 | >400 | >400 |
| Plastic adhesion (acrylic to acrylic) (psi) | 370 (adhesive/ substrate failure) | 426 (adhesive failure) | 640 (substrate failure) | 446 (substrate/ adhesive failure) | — | 426 (substrate/ adhesive failure |
| Shore D Hardness | 10 | 20 | 12 | 15 | 22 | 23 |

*substrate failure occurred in all cases

As shown in Table 2, the formulations containing asphalt, whether modified or unmodified, provide advantageous reactive hot melt properties, such as improved green strength, open time and viscosity. Formulation 1, which contains only asphalt, isocyanate and low functional poly BD polyol is functional as a reactive hot melt adhesive, however it does not provide substantial green strength such as is usually desired in a reactive hot melt adhesive.

Comparative Example 1

A sample formulation was prepared according to the method of the above examples. The formulation of the example is set out in Table 1. As shown in Table 2, Formulation A contains a tackifier and results in a very grainy and thus undesirably textured adhesive.

Comparative Example 2

A formulation was prepared utilizing the method of the above examples, but containing a commercially available reactive hot melt adhesive. The formulation comprised the incorporation of 26.8 weight percent Trumbull asphalt #1415 to the commercially available PUR-FECT LOK® 34-9014 (National Starch and Chemical Company). The addition of the asphalt to the commercially available reactive hot melt adhesive resulted in a formulation that was incompatible as shown by its extreme grainy texture. The formulation was too grainy in texture to be tested for performance properties.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A moisture curable reactive hot melt adhesive composition comprising an isocyanate, one or more polyols, one or more bituminous materials, one or more thermoplastic materials and without utilizing a compatabilizing plasticizer or a tackifier.

2. The reactive hot melt adhesive of claim 1, wherein the bituminous materials are selected from the group consisting of asphalt, polymer modified asphalt, oxidized asphalt, hot mix asphalt, performance grade asphalt, coal tar and mixtures thereof.

3. The reactive hot melt adhesive of claim 2, comprising an asphalt modified with one or more polymers selected from the group consisting of polyethylenes, polypropylenes, polystyrenes, different block, graft and random copolymers, virgin rubber, rubber from crumb rubber and mixtures thereof.

4. The reactive hot melt adhesive of claim 1, wherein the polyols are selected from the group consisting of polyester polyols, polyether polyols, castor oil and vegetable oils of different molecular weight and functionality, other fatty polyols, polybutadiene diol, polyisobutylene diol and mixtures thereof.

5. The reactive hot melt adhesive of claim 1, wherein the thermoplastic materials are selected from the group consisting of ethylene vinyl acetate copolymer (EVA), ethylene vinyl acetate terpolymers, functional EVA, ethylene acrylate copolymer, acrylic polymers, functional acrylic polymers, non-functional acrylic polymers, acrylic block copolymer, acrylic polymer having tertiary-alkyl amide functionality, polysiloxane polymers, polyesters, polystyrene copolymers, polyvinyl polymers, divinylbenzene copolymers, polyetheramides, polyvinyl acetal, polyvinyl butyral, polyvinyl acetate, polyvinyl chloride, methylene polyvinyl ether, cellulose acetate, styrene acrylonitrile, amorphous polyolefin, thermoplastic urethane, polyacrylonitrile, ethylene butadiene copolymers and/or block copolymers, styrene butadiene block copolymer, and mixtures thereof.

6. The reactive hot melt adhesive of claim 1, further comprising one or more additives selected from the group consisting of defoamers, curing catalysts, dissociation catalysts, fillers, rheology modifiers, anti-oxidants, pigments, adhesion promoters, stabilizers, aliphatic C5-C10 terpene oligomers, rosin, rosin ester, aliphatic hydrocarbons, aromatic hydrocarbons, aromatically modified aliphatic hydrocarbons, terpenes, terpene phenol, modified terpene, multifunctional phenols such as sulfur and phosphorous-containing phenol, terpene oligomers, DMDEE, paraffin waxes, microcrystalline waxes, hydrogenated castor oil, flame retardant components and mixtures thereof.

7. The reactive hot melt adhesive of claim 1, wherein the one or more polyols are present in an amount ranging from about 2 to about 98 weight % of the adhesive.

8. The reactive hot melt adhesive of claim 7, wherein the one or more polyols are present in an amount ranging from about 2 to about 80 weight % of the adhesive.

9. The reactive hot melt adhesive of claim 8, wherein the one or more polyols are present in an amount ranging from about 5 to about 50 weight % of the adhesive.

10. The reactive hot melt adhesive of claim 1, wherein the one or more bituminous materials are present in an amount ranging from about 0.1 to about 80 weight % of the adhesive.

11. The reactive hot melt adhesive of claim 10, wherein the one or more bituminous materials are present in an amount ranging from about 5 to about 50 weight % of the adhesive.

12. The reactive hot melt adhesive of claim 11, wherein the one or more bituminous materials are present in an amount ranging from about 10 to about 40 weight % of the adhesive.

13. The reactive hot melt adhesive of claim 1, wherein the one or more thermoplastic materials are present in an amount of up to about 40 weight % of the adhesive.

14. A method of bonding at least two components together using the adhesive of claim 1.

15. An article of manufacture containing the adhesive of claim 1.

* * * * *